Patented Apr. 7, 1931

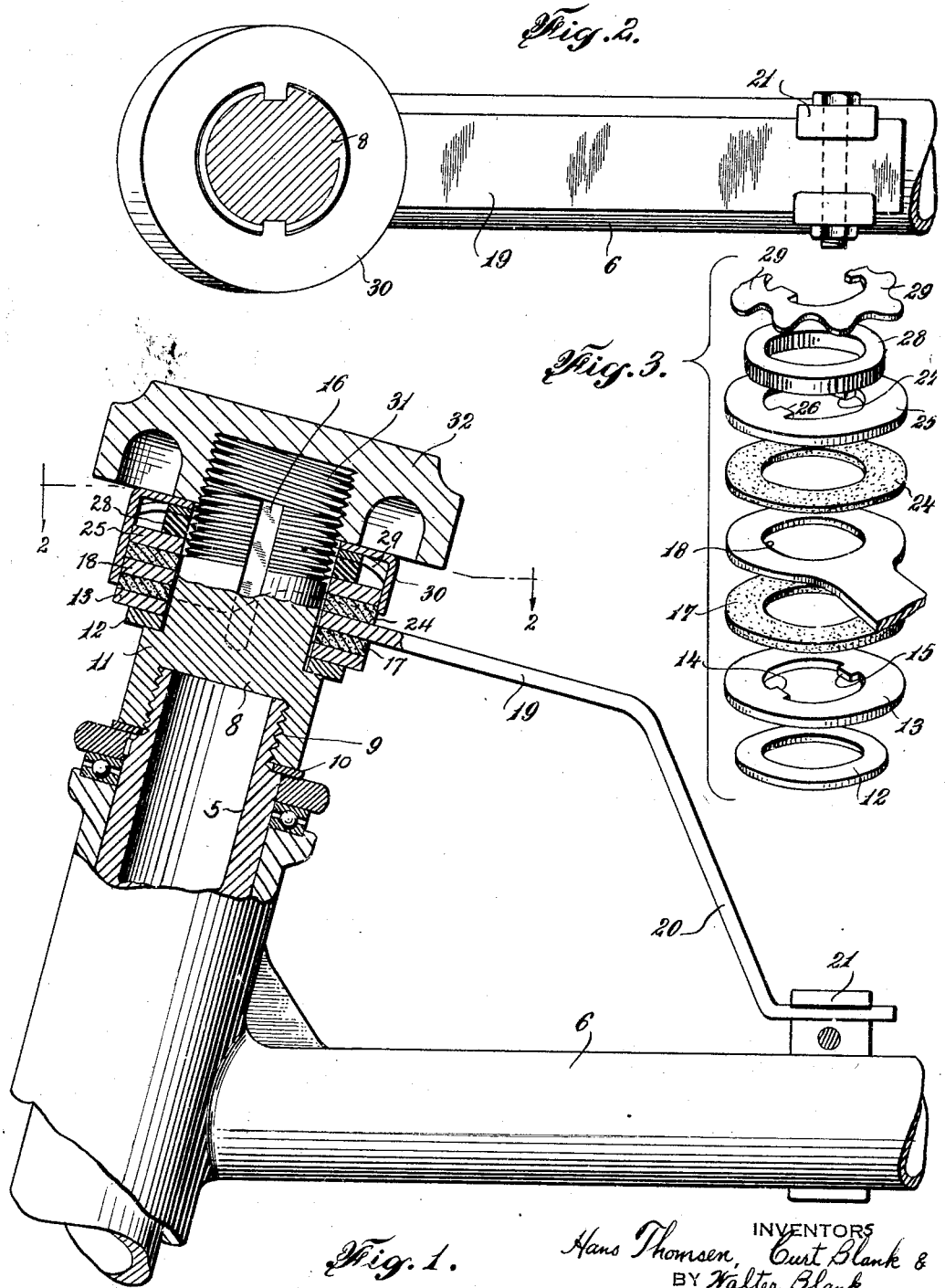

1,799,806

UNITED STATES PATENT OFFICE

HANS THOMSEN AND CURT BLANK, OF BROOKLYN, AND WALTER BLANK, OF JAMAICA, NEW YORK

STEERING-POST STABILIZER FOR MOTOR CYCLES

Application filed June 24, 1929. Serial No. 373,244.

This invention relates to motor cycle attachments and more particularly to what we term a fork or steering post stabilizer.

One of the objects of our invention is to provide a novel and new attachment for the fork post of a motor cycle constructed and arranged to prevent the ground wheel and fork post from turning too freely and sharply as when riding over rough, uneven and irregular roads.

Broadly, our invention relates to a fork post stabilizer for motor cycles in which the primary purpose and object of the attachment is to keep the front steering wheel in alignment with the motor cycle frame as uniformly as possible without effecting the steering operation.

We are aware of the existence of various types of shock absorbers for the fork posts of motor cycles, the purpose of which is to compensate for the irregular, vertical movements and oscillations due to bad road conditions. However, shock absorbers of this type fail to overcome the lateral thrusts, twisting and turning of the fork post when the front ground wheel passes in and out of holes, over railroad crossings and other irregular surfaces, with the result that motor cyclists are often thrown from the seat of the machine. In other words when the front wheel of the motor cycle suddenly enters a road depression or strikes an object such as a rail, the looseness of the fork post bearings causes the motor cycle handles to turn quickly and sharply and considerable power is required to maintain the balance of the machine without falling. Our invention therefore is to be sharply distinguished from shock absorbing devices since it is directed to increasing the steering efficiency of a motor cycle particularly under poor road conditions.

To enable others skilled in the art to more fully comprehend the underlying features of our invention, reference is had to the accompanying drawings forming part of this specification wherein Fig. 1 is a vertical sectional view showing our attachment connected to the fork post of a motor cycle.

Fig. 2 is a view taken on the line 2—2 of Fig. 1.

Fig. 3 is an exploded view showing the connecting bracket in its relation to the washers.

Referring now to the drawings wherein like reference characters designate corresponding parts throughout the several views, 5 designates the fork post and 6 the frame to which our invention is attached. The upper end of the fork post is usually threaded as at 9 and provided with a threaded nut. To mount our attachment on the top of the fork post, the nut is removed and a solid cylinder 8, the lower end of which is provided with a hole internally threaded, is screwed onto the threaded top 9 of the post against a bottom shoulder ring 10. The cylinder is cut to provide a shoulder 11 over which is first loosely positioned a steel ring 12. A second steel ring 13 slightly larger in diameter is positioned on the ring 12 and is provided with opposed inner lugs 14, 15 which are adapted to be seated in the vertical, opposed grooves 16 in the sides of the cylinder so that the ring 13 is prevented from rotation.

On the ring 13 there is positioned a thick leather ring or washer 17 which forms a seat for the circular end 18 of a steel bracket 19, said bracket being bent downwardly at 20 and fastened by a clamp 21 on the frame 6. The circular end of the bracket is loosely mounted on the cylinder so that while pressure may be exerted on the bracket, nevertheless the cylinder may rotate relative thereto.

On the circular end of the bracket, a second leather ring or washer 24 is positioned which forms a seat for a steel ring 25 provided with opposed lugs 26, 27 adapted to be seated in the grooves of the cylinder. The steel ring 25 forms a support for the thick rubber ring 28 on which is mounted a fluted bearing plate 29 also provided with opposed lugs to be seated in the grooves of the cylinder. A flanged steel cover 30 is loosely positioned on the bearing plate.

Referring particularly to Fig. 1 it will be noted that the upper portion of the cylinder is externally threaded as at 31 to receive an internally threaded top cap 32, preferably of steel or heavy metal which can be screwed down on the flanged cover 30 to exert variable pressure on the rubber ring and the bracket. In other words by tightening or loosening the top cap 32, pressure is exerted on the circular end of the bracket so that it takes up the looseness or normal free turning movement of the post. This variable pressure on the fork post increases the resistance of the normal turning movement of the post relative to the frame. It is to be understood that the pressure exerted on the post is not sufficient to completely prevent the turning or steering of the wheel but instead of allowing the post to turn as loosely and with the freedom permitted under ordinary conditions, the steering post is tightened up so to speak making it necessary to exert some effort to turn the steering wheel. Consequently when the cyclist is travelling on a smooth, good road, by loosening up the pressure on the bracket, the steering post may be rotated with the desired freedom. On the other hand when traversing rough roads, across railroad crossings and other irregular surfaces, the cyclist may increase the pressure as above indicated. It will thus be seen that by exerting variable pressure on the steering post, the motor cycle handles may be kept in a more or less steady position at all times thus making riding more comfortable and easy, overcoming fatigue and strain, and to a certain extent affording safety to the operator on poor roads.

While we have shown and described our invention with some degree of particularity, it will be realized that other modifications and changes may be resorted to under special conditions. We therefore do not wish to be limited and restricted to the exact details shown and described but reserve the right to make such changes and modifications as may fairly fall within the scope of the subject matter now being claimed.

Having shown and described our invention what we claim as new and desire to secure by Letters Patent is:

1. In combination with the frame and fork post of a motor cycle, a cylinder threaded to the top of the post, said cylinder having opposed grooves therein, a bracket mounted on said cylinder and attached to the frame, and means for exerting variable pressure on said bracket to increase the resistance of the rotary movement of said fork relative to the frame.

2. In combination with the frame and fork post of a motor cycle, a cylinder connected to the top of the post, a bracket having a circular end freely mounted on the cylinder, the opposite end of said bracket being rigidly attached to the frame, spacing rings and washers above and below the free end of the bracket, a resilient ring on one of the top spacing rings, a cover on said resilient ring and a top cap threaded to the top of the cylinder bearing against the said cover to increase or decrease the pressure on the free end of the bracket to vary the resistance of the turning movement of the fork relative to the frame.

In testimony whereof we affix our signatures.

HANS THOMSEN.
CURT BLANK.
WALTER BLANK.